Sept. 29, 1964 P. UNGNADNER ETAL 3,150,580
AUTOMATIC EXPOSURE CONTROL FOR MULTIPLE-OBJECTIVE
MOTION PICTURE CAMERAS
Filed May 15, 1959 3 Sheets-Sheet 1

INVENTORS
PETER UNGNADNER
BY ERICH FILSINGER

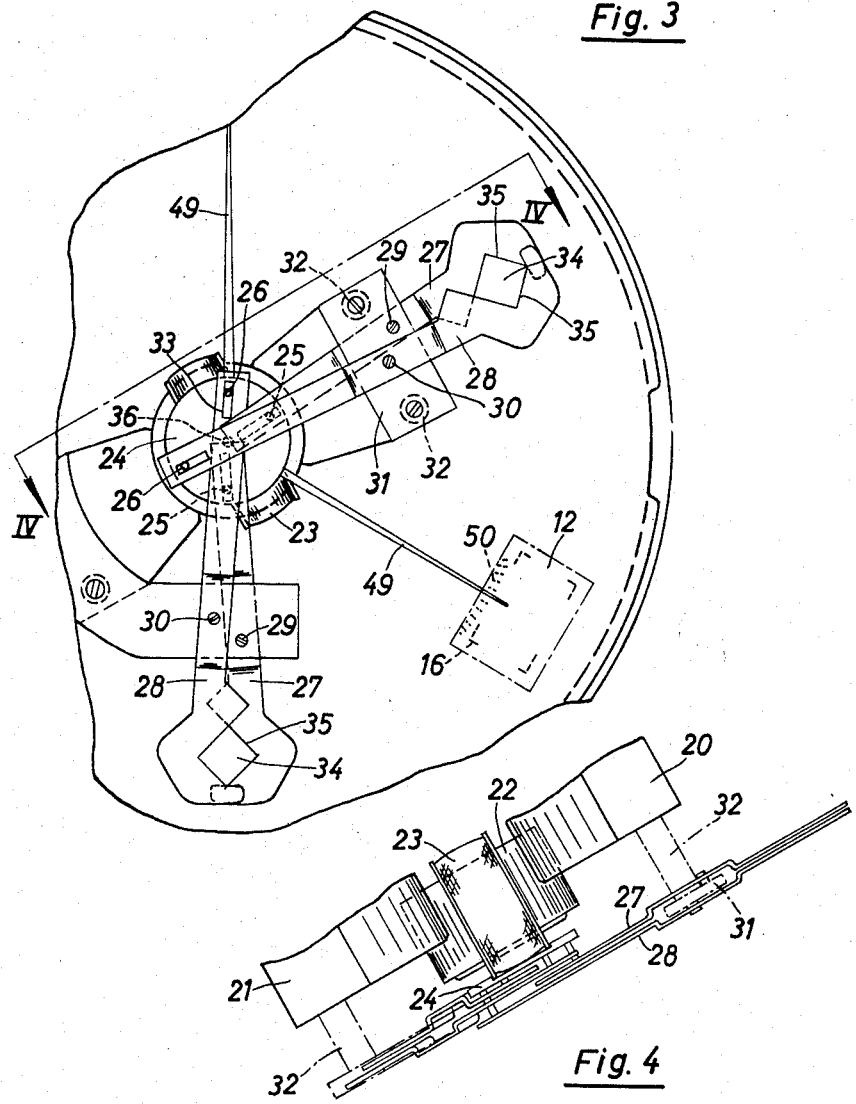

INVENTORS
PETER UNGNADNER
ERICH FILSINGER
BY

United States Patent Office 3,150,580
Patented Sept. 29, 1964

3,150,580
AUTOMATIC EXPOSURE CONTROL FOR MULTIPLE-OBJECTIVE MOTION PICTURE CAMERAS
Peter Ungnadner and Erich Filsinger, Munich, Germany, assignors to Agfa Aktiengesellschaft, Leverkusen-Bayerwerk, Germany
Filed May 15, 1959, Ser. No. 813,486
Claims priority, application Germany, May 20, 1958,
A 29,533
9 Claims. (Cl. 95—64)

The present invention relates to cameras.

More particularly, the present invention relates to motion picture cameras of the multiple-objective type where a selected objective can be placed by the operator in picture-taking position. In particular, the present invention relates to cameras of this latter type which are provided with automatic exposure controlling structure.

One of the objects of the present invention is to provide a camera of the above type with a simple efficient structure for automatically controlling the exposure apertures of the objectives according to the lighting conditions.

Another object of the present invention is to provide a simple diaphragm control structure of the above type wherein the several diaphragm of the plurality of objectives are controlled directly from a single exposure meter.

A further object of the present invention is to provide a structure of this latter type which does not require any complex connections to extend from the interior to the exterior of the camera housing.

It is also an object of the present invention to provide a structure of the above type wherein the exposure controlling structure is protected from foreign matter, dust, etc.

Yet another object of the present invention is to provide a structure of the above type which makes it possible to interchangeably connect different sets of objectives with the same light meter.

Still another object of the present invention is to provide a structure of the above type wherein the light meter is conserved by being automatically energized only when the camera is used.

The objects of the present invention also include the provision, in a motion picture camera of the above type, of structure for indicating the framing of the particular objective which is placed by the operator in picture-taking position.

Also included among the objects of the invention is a structure for indicating the light measurement to the operator.

A still further object of the present invention is to provide a multiple-objective unit which includes automatic aperture-controlling structure and which can be assembled and disassembled as a unit.

Also, it is an object of the invention to provide a unit of this latter type which can be connected without difficulty to existing cameras without necessitating changes in the structure within the camera housing.

With the above objects in view, the present invention includes in a motion picture camera, a camera housing, a plurality of objectives, a carrier means carrying the objectives, and a connecting means connecting the carrier means to the camera housing for movement with respect to the latter to a plurality of positions where the objectives are respectively in picture-taking positions. A plurality of diaphragms respectively cooperate with the objectives and, in accordance with the present invention, a single light-sensing means is carried by the carrier means and cooperates directly with all of the diaphragms for automatically setting the latter according to the lighting conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary front elevation illustrating the galvanometer and diaphragms cooperating therewith, FIG. 3 showing the structure as it appears when the front wall of a turret housing of the invention is removed;

Figure 5:
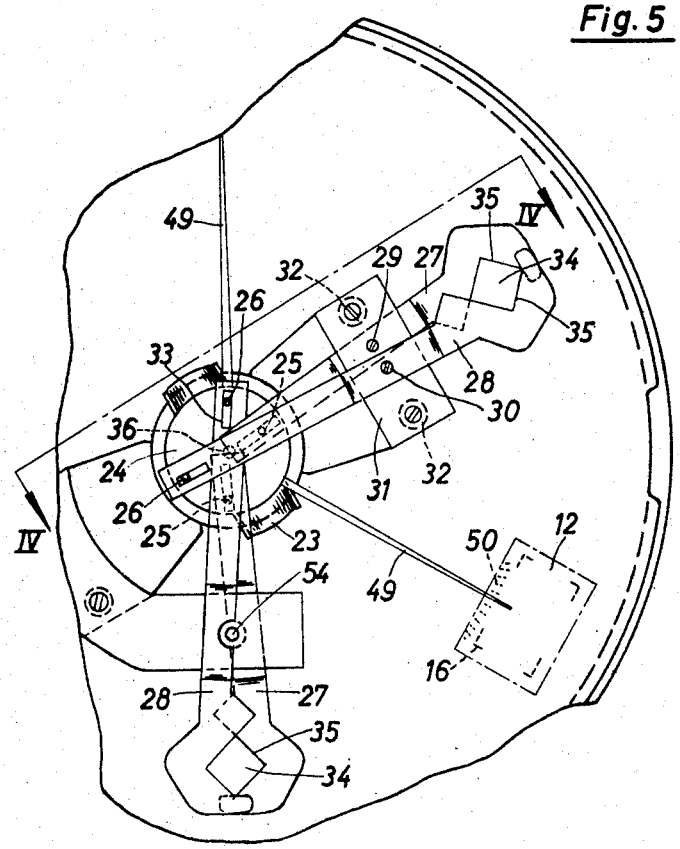

FIG. 4 is a fragmentary view of the structure of FIG. 3 taken along the line IV—IV of FIG. 3 in the direction of the arrows; and FIG. 5 is a fragmentary front elevation similar to the structure of FIG. 3, where two diaphragm levers are pivoted in the upper part on two pivots equidistant from the galvanometer axis and in the lower part on a common pivot. The distance between said pivots or pivot and the galvanometer axis in a median position of said levers is divided by driving pins of the galvanometer in the same ratio.

Figure 1:
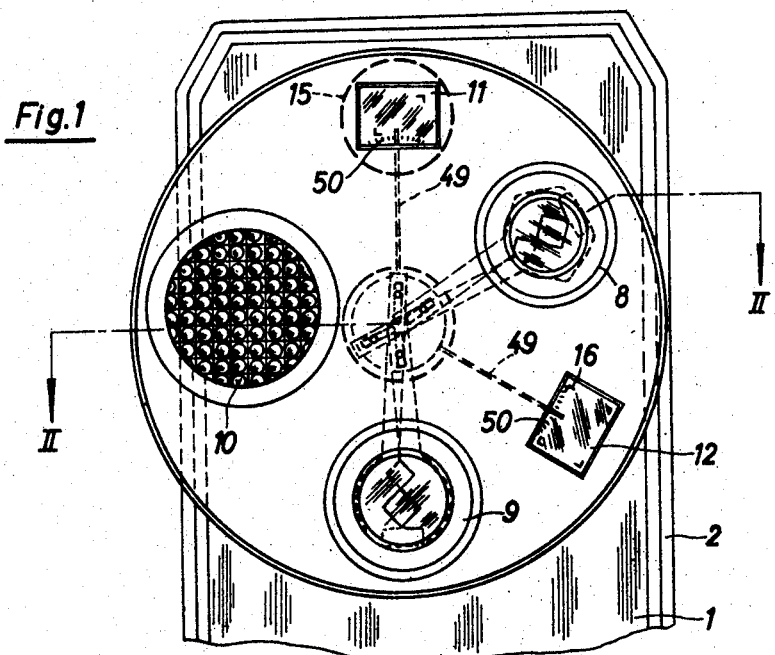
FIG. 1 is a fragmentary front elevation of a motion picture camera according to the present invention showing the structure of the invention as it appears when looking toward the front of the camera.
Figure 2:
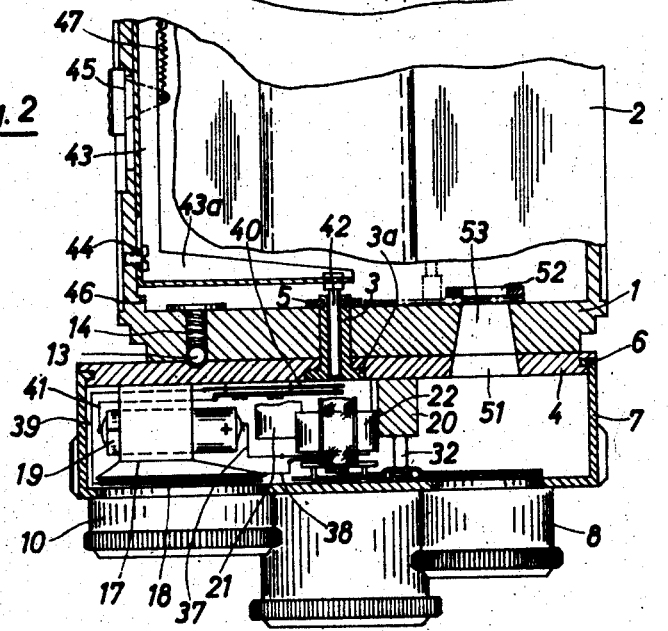
FIG. 2 is a sectional view taken along the line II—II of FIG. 1 in the direction of the arrows and fragmentarily illustrating part of the structure within the camera housing.

Referring to FIGS. 1 and 2 of the drawings, it will be seen that the camera housing 2 illustrated therein includes a front wall 1 carrying a pivot pin 3 which serves to turnably support a carrier means in the form of a hollow turret housing having a rear wall 4 connected directly to the pivot pin 3 so that the latter serves as a connecting means connecting the carrier means to the housing of the camera for movement with respect to the housing to a plurality of positions where objectives carried by the carrier means or turret are respectively in picture-taking positions, as will be apparent from the description which follows.

As may be seen from FIG. 2, the pivot pin 3 has a front enlarged end 3a seated in a recess of the rear wall 4 of the turret and at its rear end in the interior of the camera housing 2 the pivot pin 3 carries a snap ring 5 which cooperates with the enlarged end 3a of the pivot pin to prevent axial movement of the latter with respect to the camera as well as to retain the rear wall 4 of the turret housing next to the front face of the front wall 1 of the camera 2.

The turret housing or camera means includes in addition to the rear wall 4 a cup-like enclosure 7 having a front wall parallel to the rear wall 4 and a cylindrical side wall fixed to and extending rearwardly from the front wall and removably connected at its rear periphery to the periphery of the circular plate 4. For example, a bayonet connection 6 may be used for this purpose, and this bayonet connection 6 not only fixes the enclosure 7 axially with respect to the wall 4, but also determines the angular position of the enclosure 7 with respect to the wall 4.

The front wall of the carrier means or turret 4, 7 carries, in the illustrated example, a pair of objectives 8 and 9, the objective 8, for example, having a longer focal length than the objective 9. Also, the front wall of the carrier means or turret 4, 7 carries a honeycomb window 10 which serves to admit light to a light-sensing means located in the interior of the hollow turret and carried by the wall 4 thereof. The front and rear walls of the hollow turret housing are respectively formed with a pair of aligned view finder windows 11 forming part of the view finder of the objective 8 and with a pair of aligned view finder windows 12 forming part of the view finder of the objective 9. As is apparent from FIG. 1, the pair of objectives 8 and 9 are angularly spaced from each other by 120°, and the same is true of the pairs of view finder windows 11 and 12. Also, the rear surface of the rear wall 4 is formed with a pair of recesses angularly displaced with respect to the pivot pin 3 by 120° and respectively cooperating with the spring-pressed ball 13 (FIG. 2) for releasably holding the turret in a selected angular position where one or the other of the objectives is in a picture-taking position. As may be seen from FIG. 2, a spring 14 in a bore of the wall 1 of the camera urges the ball 13 toward the wall 4.

The rear wall 4 of the rotary hollow turret is formed with a pair of cutouts 51 respectively coaxial with the pair of objectives 8 and 9, and when the objective 8 is in its picture-taking position, as shown in FIGS. 1 and 2, the cutout 51 which is coaxial therewith is aligned with an opening or exposure aperture 53 passing through the wall 1, the film gate 52 being aligned with the opening 53. In the same way, when the objective 9 is in picture-taking position, the cutout 51 which is coaxial with the objective 9 will be aligned with the opening 53. If desired, one group of lenses may be located in the tubular housing of each objective 8 and 9 while a second stationary group of lenses may be located in the opening 53 of the wall 1. It will be noted that with the objective 8 in the picture-taking position as illustrated in FIGS. 1 and 2, the aligned view finder windows 11 are in line with a view finder aperture 15 formed in the front wall 1 of the camera housing and shown in dotted lines in FIG. 1. In the same way, the windows 12 will be aligned with the opening 15 when the objective 9 is in the picture-taking position. As is apparent from FIG. 1, framing marks 16 are provided for each view finder. Thus, either the front or rear window 12 may be provided with a set of framing marks 16 to show to the operator the field which will be photographed by the objective 9, and either the front or rear window 11 is provided with similar marks indicating a smaller field area which will be photographed through the objective 8 of longer focal length.

As was pointed out above, the rear wall 4 of the rotary turret housing 4, 7 carries in the interior of the latter a light-sensing means, and this latter means includes a photo-resistance 18 and a battery 19 supported by a bracket 17 which is directly carried by the wall 4 at the front face of the latter. This front face of the wall 4 carries additional supporting brackets 20, 21. These brackets 20, 21 carry a galvanometer 22 to whose rotor 23 is fixed a plate 24 which in turn fixedly carries a pair of short pins 25 and a pair of longer pins 26, all of these pins extending forwardly from the plate 24 parallel to the rotor axis, the plate 24 itself being normal to the axis of the galvanometer rotor.

A pair of diaphragms respectively cooperate with the objectives, and each diaphragm includes a pair of levers 27 and 28, the lever 27 being shorter than the lever 28. The lever 27 of each diaphragm is turnably supported intermediate its ends by a pivot pin 29 while the lever 28 is pivotally supported intermediate its ends by a pivot pin 30. These pivot pins 29 and 30 are fixedly carried by a plate 31 which is in turn carried by a pair of tubular members 32 which are fixedly carried by the bracket 20 in the case of the diaphragm which cooperates with the objective 8. The levers 27 and 28 of the diaphragm which cooperates with the objective 9 are supported in an identical manner by a pair of pivot pins 29 and 30 respectively, which are carried by a plate shaped somewhat differently from the plate 31 and which is also supported by the bracket 21 on tubular members 32. All of the levers 27 and 28 have free ends overlapping the plate 24 which is fixed to the galvanometer rotor, and these inner free ends of the levers are respectively formed with elongated slots 33. The pins 25 and 26 described above extend into the slots 33, respectively.

The outer free ends of the levers 27 and 28 form the diaphragm apertures 34. Thus, each pair of cooperating levers 27 and 28 has a pair of overlapping outer aperture-forming free ends which will form an aperture 34 whose size is determined by the angular position of the pair of levers 27 and 28 with respect to each other. As may be seen from FIG. 3, the lever 27 is formed with a substantially V-shaped notch 35 which is overlapped by an identical but oppositely directed V-shaped notch of the lever 28 so as to form the aperture 34 shown in FIG. 3.

In an intermediate aperture position, which is to say, an aperture size between and substantially different from the largest and smallest possible apertures, the pins 25 and 26 which cooperate with one pair of levers 27, 28 are located substantially along a straight line connecting the aperture 34 and the turning axis 36 of the galvanometer rotor, as indicated in FIG. 3, and also all of the pins 25 and 26 are equidistant from the axis 36 so that they are located on a common circle. Moreover, it will be seen that the pins 25 and 26 of each pair of levers 27 and 28 are located on opposite sides of the axis 36. In order to provide equal angular movement of the levers 27 and 28 in response to turning of the plate 24 with the galvanometer rotor, the pivots 29 and 30 are displaced with respect to each other as indicated in FIG. 3, so that the pin 29 divides the lever 27 into a pair of lever arms having a given ratio with respect to each other and the pin 30 divides the lever 28 into a pair of lever arms having the same ratio with respect to each other. Thus, when the galvanometer rotor turns, the plate 24 turns therewith and the pin-and-slot connecting means 25, 26, 33 will convert the rotary movement of the plate 24 into angular movement of the diaphragm levers 27, 28 through equal angular distances with the levers 27 turning in an opposite direction from the levers 28. Both diaphragms will be set simultaneously and will provide apertures of the same size coaxial with the objectives, respectively. The pins 25 terminate short of the planes in which the levers 28 are located so that they do not interfere with the levers 28, and the longer lever 28 of one diaphrgam extends between the pins 25 and 26 which cooperate with the levers of the other diaphragm.

The disc 24 also fixedly carries pointers 49 which extend into the space between the aligned pairs of view finder windows 11 and 12 so that the ends of these pointers 49 are rendered visible to the operator, and one of the windows of each pair of windows 11 and 12 is provided with a scale 50 with which a pointer 49 cooperates. Thus, when the objective 8 is in picture-taking position, the substantially vertical pointer 49 of FIG. 1 will have its top end visible to the operator through the cutout 15 and the upper scale 50 of FIG. 1 will also be visible at this time to the operator when looking through the view finder at the subject, and thus the light value will be indicated to the operator in this way. The same is true, of course, of the windows 12 and the other pointer 49 and scale 50 when the objective 9 is in picture-taking position.

The positive pole of the battery 19 is electrically connected through a conductor 37 with the galvanometer 22, and from the latter a conductor 38 serves to provide an electrical connection between the galvanometer and the photo-resistance 18. The photo-resistance 18 is in turn connected through a conductor 39 with a switch 40, and an additional conductor 41 leads from the switch 40 to the negative pole of the battery 19. The switch 40 is formed by springy leaves which are normally out of contact and which are placed in contact with each other to close the switch upon forward movement of a pin 42 (FIG. 2) which is axially movable in an axial bore of the turret supporting pivot pin 3. An elongated member 43 is carried by a pin-and-slot mounting 44 at the left side wall of the camera housing 2, as viewed in FIG. 2, for movement toward and away from the front wall 1 of the camera housing, and this member 43 is fixed at its front end to a cross arm 43a which fixedly carries the switch-operating pin 42. The camera is set into operation when the operator moves the manually operable control 45 toward the front of the camera. This control 45 is connected by a spring 47 to the member 43 so that during the initial part of the movement of the control 45 by the operator, the member 43 will move forwardly to close the switch 40 and set the light-sensing means into operation. A stop shoulder 46 in the camera housing limits the forward movement of the member 43 and after the latter engages the stop 46, the operator continues the forward movement of the control 45 to start the camera after the member 43 has reached its forwardmost position, so that the light-sensing means has already been set into operation automatically before the camera is started. Thus, it is possible to move the control 45 forwardly through part of its stroke for the purpose of energizing the light-sensing means without starting the camera.

It should be noted that instead of providing for each diaphragm pivots 29 and 30 which are displaced with respect to each other, it is possible to provide for each pair of diaphragm levers pivots which are located at the same distance from the rotor axis as is seen from the upper part of FIG. 5 or it is possible to provide for each pair of diaphragh levers 27, 28, a common pivot 54 corresponding to the pivots 29, 30 as is seen from the lower part of FIG. 5. In this case, however, the pins 25, 26 are not located equidistant from the rotor axis. The inner pin 25 in this construction is located nearer to the rotor axis than the outer pin 26, and the distances of the pins 25 and 26 from the rotor axis in such a construction are such that the length of the arm of lever 27 extending from its intermediate pivot axis to the pin 25 has to the distance of the pin 25 from the rotor axis the same ratio as the length of the arm of lever 28 from its intermediate pivot to the pin 26 has to the distance of the pin 26 to the rotor axis. Thus, with this latter arrangement, it is possible to provide each pair of diaphragm levers with a common pivot and still turn each pair of diaphragm levers through equal and opposite angular distances in response to the turning of the plate 24.

While the invention has been described above in connection with a rotary turret, the invention is also applicable to structures having non-rotary objective-carrying plates.

It will be seen from the description above, that the diaphragms and light-sensing means controlling the same are located in the housing 4, 7 in a dust-proof manner so as to be free from foreign matter, dust, and the possibility of external mechanical injury. The turret housing 4, 7 and all of the structure carried thereby can be mounted as a unit on the camera. Furthermore, because of the fact that the objectives are carried by the front wall of the turret housing while the light meter and diaphragms are carried by the rear wall of the turret housing, it is possible to remove the cup-shaped enclosure 7 by releasing the bayonet connection 6, so as to remove only the objectives and the honeycomb window 10, the rest of the structure remaining fixed to the wall 4. Then, a different enclosure 7 having objectives of different focal lengths will be connected with the wall 4, so that in this way it is possible for the same light-sensing means and diaphragms to cooperate with different sets of objectives. Of course, where such interchangeable sets of objectives are contemplated, the image framing indicators 16 will be provided on the windows 11 and 12 which are formed in the front wall of the turret housing.

Because of the fact that the battery 19 is energized only when the camera is used, the light-sensing means is conserved and will have a much longer life.

It will be understood that each of the elements described above, or two or more together, may also find a useful application in other types of cameras differing from the types described above.

While the invention has been illustrated and described as embodied in multiple-objective motion picture cameras, it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; and means connecting said rotor to said free ends of said levers of each diaphragm for automatically turning said levers in response to turning of said rotor respectively to positions where each pair of levers provides at its overlapping aperture-forming ends an aperture of the proper size for the lighting conditions.

2. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; and pin-and-slot means connecting said rotor to said free ends of said levers of each diaphragm for automatically turning said levers in response to turning of said rotor respectively to positions where each pair of levers provides at its overlapping aperture-forming ends an aperture of the proper size for the lighting conditions.

3. In a motion picture camera, in combination, a camera housing having a wall formed with an exposure aperture; a plurality of objectives; carrier means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures.

4. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures, the pair of pins which cooperate with each pair of levers being located, when the levers form an aperture intermediate the largest and smallest possible apertures, substantially along a straight line passing through the center of the aperture and the rotor axis at opposite sides of the rotor axis, respectively.

5. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures, the pair of pins which cooperate with each pair of levers being located, when the levers form an aperture intermediate the largest and smallest possible apertures, substantially along a straight line passing through the center of the aperture and the rotor axis at opposite sides of the rotor axis, respectively, one of the levers of each pair of levers being shorter than the other and the pin which cooperates with the shorter lever being located out of the path of movement of the longer of each pair of levers.

6. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures, the pair of pins which cooperate with each pair of levers being located, when the levers form an aperture intermediate the largest and smallest possible apertures, substantially along a straight line passing through the center of the aperture and the rotor axis at opposite sides of the rotor axis, respectively, said pins being located at equal radial distances from the rotor axis and the turning axes of each pair of levers being displaced with respect to each other and providing each of the levers of each pair of levers with lever arms whose ratio is the same for both levers of each pair.

7. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures, the pair of pins which cooperate with each pair of levers being located, when the levers form an aperture intermediate the largest and smallest possible apertures, substantially along a straight line passing through the center of the aperture and the rotor axis at opposite sides of the rotor axis, respectively, the turning axis of each lever being located, for each pair of levers, at the same distance from the rotor axis and the pins which cooperate with each pair of levers being spaced from the rotor axis by different distances, respectively, which provide the levers of each pair with equal and opposite turning angles in response to turning of the rotor.

8. In a motion picture camera, in combination, a camera housing having a wall formed with an exposure aperture; a plurality of objectives; carrier means carrying said objectives; connecting means connecting said carrier means to said housing for movement with respect to the latter to a plurality of positions where said objectives are respectively in picture-taking positions aligned with said exposure aperture; a plurality of diaphragms cooperating with said objectives, respectively, each diaphragm being composed of a pair of levers turnably carried intermediate their ends by said carrier means and having overlapping aperture-forming ends forming an aperture the size of which is determined by the angular position of the pair of levers with respect to each other, each pair of levers having, respectively, free ends opposite from said aperture-forming ends thereof; light sensing means carried by said carrier means for sensing the lighting conditions and said light-sensing means including a galvanometer whose rotor assumes an angular position determined by the lighting conditions; a plate fixed to said galvanometer rotor for turning movement with the latter, said free ends of each pair of levers overlapping said plate and formed with elongated slots, respectively; and a plurality of pins extending parallel to the rotor axis into said slots, so that turning of the galvanometer rotor will result in turning of said levers and setting of the apertures, the pair of pins which cooperate with each pair of levers being located, when the levers form an aperture intermediate the largest and smallest possible apertures, substantially along a straight line passing through the center of the aperture and the rotor axis at opposite sides of the rotor axis, respectively, one of the levers of each pair of levers being shorter than the other and the pin which cooperates with the shorter lever being located out of the path of movement of the longer of each pair of levers, the longer lever of each diaphragm extending between the pair of pins which cooperate with the levers of another diaphragm.

9. In a motion picture camera, in combination, a camera housing having a wall formed with an exposure aperture; a plurality of objectives; carrier means carrying said objectives; connecting means connecting said carrier means to said camera housing for movement with respect thereto to a plurality of positions where said objectives are respectively in picture-taking positions aligned with said exposure aperture; a plurality of diaphragms cooperating with said objectives; electrical light-sensing means carried by said carrier means and cooperating with said diaphragms for automatically setting the latter when said electrical light-sensing means is energized, said light-sensing means including a switch which upon being closed energizes said light-sensing means; a manually operable camera-starting control carried by said camera housing to be actuated by the operator for starting the camera; and means transmitting movement of said control to said switch for closing the latter to energize said light-sensing means when the operator starts the camera, said carrier means being formed by a turret carried by the camera housing for movement around a given axis and said connecting means including an axially bored pivot pin connected to said camera housing and supporting said turret for turning movement, said switch for energizing said light-sensing means extending across the axis of said bore adjacent to said pivot pin and the means for transmitting movement of said manually operable control to said switch including a switch-operating pin located in and axially movable along said bore.

References Cited in the file of this patent

UNITED STATES PATENTS

| | | |
|---|---|---|
| 1,779,879 | Wittel | Apr. 7, 1931 |
| 1,884,169 | Owens | Oct. 25, 1932 |
| 2,013,362 | Riszdorfer | Sept. 3, 1935 |
| 2,091,881 | Riszdorfer | Aug. 31, 1937 |
| 2,236,069 | Robinton | Mar. 25, 1941 |
| 2,421,499 | Guedon | June 3, 1947 |
| 2,518,717 | Rath | Aug. 15, 1950 |
| 2,640,777 | Fachman | June 2, 1953 |
| 2,724,311 | Albert | Nov. 22, 1955 |
| 2,838,985 | Burger et al. | June 17, 1958 |
| 2,841,064 | Bagby et al. | July 1, 1958 |
| 2,865,274 | Richartz | Dec. 23, 1958 |